(12) United States Patent
Reial et al.

(10) Patent No.: US 10,448,271 B2
(45) Date of Patent: Oct. 15, 2019

(54) MOBILITY MEASUREMENT INITIATION USING A TRIGGERING LINK QUALITY MEASUREMENT SIGNAL

(71) Applicant: Telefonaktiebolaget LM Ericsson (publ), Stockholm (SE)

(72) Inventors: Andres Reial, Malmö (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 15/524,456

(22) PCT Filed: Jun. 7, 2016

(86) PCT No.: PCT/EP2016/062895
§ 371 (c)(1),
(2) Date: May 4, 2017

(87) PCT Pub. No.: WO2017/211392
PCT Pub. Date: Dec. 14, 2017

(65) Prior Publication Data
US 2018/0199220 A1    Jul. 12, 2018

(51) Int. Cl.
*H04W 24/08* (2009.01)
*H04W 36/00* (2009.01)
(Continued)

(52) U.S. Cl.
CPC .......... *H04W 24/08* (2013.01); *H04B 7/0695* (2013.01); *H04W 8/02* (2013.01);
(Continued)

(58) Field of Classification Search
CPC ......... H04W 36/0083; H04W 36/0085; H04W 36/0088; H04W 36/0094
See application file for complete search history.

(56) References Cited

U.S. PATENT DOCUMENTS

| | | | | |
|---|---|---|---|---|
| 2017/0325244 A1* | 11/2017 | Zhang | ............... | H04W 36/0088 |
| 2017/0332283 A1* | 11/2017 | Kubota | ............ | H04W 36/0083 |
| 2018/0063736 A1* | 3/2018 | Sadeghi | ............ | H04W 72/0446 |

FOREIGN PATENT DOCUMENTS

| | | |
|---|---|---|
| WO | 2015026286 A1 | 2/2015 |
| WO | 2016045695 A1 | 3/2016 |

OTHER PUBLICATIONS

Ericsson, "Mobility execution in NR", 3GPp TSG-RAN WG2 #94, May 23-27, 2016, pp. 1-2, Nanjing, China, Tdoc R2-164000.

* cited by examiner

*Primary Examiner* — Pao Sinkantarakorn
(74) *Attorney, Agent, or Firm* — Coats & Bennett, PLLC (57) ABSTRACT

The disclosure relates to methods, devices, and computer programs in mobile communications. More specifically, the proposed technique relates to measuring link quality using signals transmitted by the network for use by wireless devices. In particular the disclosure relates to enabling efficient measurements of such link quality measurement signals. This object is achieved by a method for handling link quality measurements, the method being performed by a wireless device in a wireless communication network. The method comprises receiving, from a network node in the wireless communication network, measurement parameters defining a triggering link quality measurement signal, detecting the triggering link quality measurement signal, and performing, in response to the detection of the triggering link quality measurement signal, measurements on other link quality measurement signals.

27 Claims, 5 Drawing Sheets

(51) Int. Cl.
*H04W 8/02* (2009.01)
*H04W 24/10* (2009.01)
*H04W 72/08* (2009.01)
*H04B 7/06* (2006.01)
H04B 7/005 (2006.01)
H04W 16/28 (2009.01)
H04W 36/06 (2009.01)

(52) U.S. Cl.
CPC ....... *H04W 24/10* (2013.01); *H04W 36/0088* (2013.01); *H04W 72/085* (2013.01); *H04B 7/005* (2013.01); *H04W 16/28* (2013.01); *H04W 36/06* (2013.01)

MOBILITY MEASUREMENT INITIATION USING A TRIGGERING LINK QUALITY MEASUREMENT SIGNAL

TECHNICAL FIELD

The disclosure relates to methods, devices, and computer programs in mobile communications. More specifically, the proposed technique relates to measuring link quality using signals transmitted by the network for use by wireless devices. In particular the disclosure relates to enabling efficient measurements of such link quality measurement signals.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In an UTRAN and an E-UTRAN, a User Equipment, UE, i.e. a wireless device, is wirelessly connected to a Radio Base Station, RBS, commonly referred to as a NodeB, NB, in UMTS, and as an evolved NodeB, eNodeB or eNB, in LTE. A Radio Base Station, RBS, or an access point is a general term for a radio network node capable of transmitting radio signals to a UE and receiving signals transmitted by a UE. In Wireless Local Area Network, WLAN, systems the wireless device is also denoted as a Station, STA.

LTE uses downlink reference signals transmitted by the eNodeBs. Some of the reference signals are cell specific, which means that, these do not depend/change per user but remain same for all the users in one cell, once configured. A user equipment, UE, receiving the reference signal can measure the quality of neighbor cells for mobility purposes. In LTE, some reference signals are broadcasted in an always-on manner and over the full bandwidth, regardless of the presence or position of UEs in the system. These signals are called cell specific reference signals, CRS, and are easy to measure and yield consistent results, but the static signaling leads to high resource usage, interference, and base station energy consumption.

Handover is an important part of any mobile communications system. In legacy systems, handover is the process of transferring an ongoing connection of a wireless device from one base station (the serving) to another base station (the target), or from one cell to another within the same base station. This is done to accomplish a transparent service or service continuity over a larger area. The handover should happen without any loss of data and preferably with as short interruption as possible. In legacy cell-based systems like LTE, the cell-specific reference signals, CRSs, are used for mobility measurements.

In future communication networks, also referred to as the 5th generation mobile networks, there will be evolvement of the current LTE system to the so called 5G system. One of the main tasks for 5G is to improve throughput and capacity compared to LTE. This is in part to be achieved by increasing the sample rate and bandwidth per carrier. 5G is also focusing on use of higher carrier frequencies i.e., above 5-10 GHz.

Future communications networks are expected to use advanced antenna systems to a large extent. With such antennas, signals will be transmitted in narrow transmission beams to increase signal strength in some directions, and/or to reduce interference in other directions. When the antenna is used to increase coverage, handover may be carried out between transmission beams of the serving radio access network node or of the neighbour radio access network nodes. The transmission beam through which the radio access network node is currently communicating with the wireless device is called the serving beam and the transmission beam it will hand over to, or switch to, is called the target beam. The potential target beams for which measurements are needed are called candidate beams.

Applying the principle of continuous transmission of reference signals in all individual transmission beams in such a future cellular communications network may be convenient for wireless device measurements, but it may degrade the performance of the network. For example, continuous transmission of reference signals in all individual transmission beams may consume resources available for data, and generate a lot of interference in neighbouring cells, and higher power consumption of the radio access points.

The LTE-type solution, which implies that detection of any sufficiently strong reference signal causes the wireless device to measure and report, is inefficient in several respects. For example, the wireless device must constantly be exercising the detection algorithm for detecting the reference signals, which entails correlating the received sample sequences against one or more reference sequences. If the network is non-synchronized (or loosely synchronized), the extent of the search window may be large, which causes high computational complexity.

On the network side, the number of reports may be higher compared to LTE, due to more frequent beam updates. The various access nodes must be prepared to receive measurement reports from different wireless devices wherever any reference signal is transmitted in the neighborhood—the exact measurement trigger instances are unknown to the network since it may not be possible to predict exactly which wireless devices can hear which reference signals.

To avoid always-on signaling, one possible approach, that has been discussed for the next generation systems (also referred to as 5G) is that the network turns on reference signals, in a wireless device-specific manner only in relevant candidate beams and in situations when mobility is likely needed (e.g. when signal strength is decreasing and/or load balancing needs to be applied). Then the candidate beams may be selected from a fixed grid of beams. Measurements may then be initiated only when the network obtains an indication that a beam update for the wireless device may be needed, e.g. when decreasing serving beam quality is detected due to wireless device movement, or when the wireless device needs to acquire a serving beam when accessing a new frequency band for the first time. The candidate beams may be transmitted from a single access point or from several access points.

Hence, the network can configure the wireless device (via, e.g., Radio Resource Control, RRC, signaling) to measure and report candidate beam quality, preferably including the list of reference signals to measure. The wireless device thus receives a measurement command indicating the time/frequency resources and sequences of the reference signals to measure, as well as the measurement and reporting configuration. Once the wireless device has performed mobility measurements and reported the results, the network turns the candidate beams off again, i.e. the reference signal transmissions in the candidate beams cease.

Thus, tightly controlled measurement and reporting mechanism avoids the above potential problem of deluge of reports since reports are requested explicitly. However, the signaling overhead associated with initiating the individual measurement sessions may be a drawback in some systems and deployments. Thus, there a need for improved methods of initiating measurements.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This object is achieved by a method for handling link quality measurements, the method being performed by a wireless device in a wireless communication network. The method comprises receiving, from a network node in the wireless communication network, measurement parameters defining a triggering link quality measurement signal, detecting the triggering link quality measurement signal, and performing, in response to the detection of the triggering link quality measurement signal, measurements on other link quality measurement signals. Thereby, a very robust and lightweight signaling mechanism is provided.

According to some aspects, the method comprises performing, in response to the detection of the triggering link quality measurement signal, measurements on the triggering link quality measurement signals. The proposed method enables detailed control over mobility measurement and reporting behavior of individual wireless devices, without requiring explicit per-measurement signaling for each wireless device, as the trigger signal is also a link quality measurement signal.

According to some aspects, the method comprises reporting the performed measurements to the network node or to one or more other network nodes in the wireless communication network. Hence, the proposed technique also makes possible the use of conventional Automatic Neighbor Relations, ANR, establishment approaches in new, beam-based systems. Otherwise, direct application of the legacy measurement and reporting criteria would lead to excessive reporting traffic and related uplink resource usage.

According to some aspects, the triggering link quality measurement signal is a link quality measurement signal of a serving link used for downlink transmissions from the network node to the wireless device. The proposed technique reduces the wireless device processing load associated with reference signal monitoring by allowing the monitoring to be limited to a single time/frequency synchronization setting.

According to some aspects, the other link quality measurement signals are link quality measurement signals of candidate links for downlink transmissions to the wireless device. However, no resources are wasted in monitoring for the reference sequences of these signals, until there is actually a signal to measure.

According to some aspects, the disclosure relates to a method for handling link quality measurements, the method being performed by a network node. The method comprises transmitting, to one or more wireless devices, measurement parameters defining a triggering link quality measurement signal, transmitting the triggering link quality measurements signal; and initiating transmission of other mobility measurement signals.

According to some aspects, the disclosure relates to wireless device configured for handling link quality measurements. The wireless device comprises a radio communication interface configured to communicate with a network node and processing circuitry. The processing circuitry is configured to cause the wireless device to receive, from a network node in the wireless communication network, measurement parameters defining a triggering link quality measurement signal, to detect the triggering link quality measurements signal, and to perform, in response to the detection of the triggering link quality measurement signal, measurements on other link quality measurement signals.

According to some aspects, the disclosure relates to network node, in a communication system, being configured for handling link quality measurements. The network node comprises a radio communication interface configured for communication with one or more wireless devices and processing circuitry. The processing circuitry is configured to cause the network node to transmit, to one or more wireless devices, measurement parameters defining a triggering link quality measurement signal to transmit the triggering link quality measurements signal; and to initiate transmission of other mobility measurement signals.

According to some aspects, the disclosure relates to computer program comprising computer program code which, when executed, causes a network node to execute the methods described above and below.

According to some aspects, the disclosure relates to computer program comprising computer program code which, when executed, causes a wireless device to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

As discussed above, tightly controlled measurement and reporting mechanisms have been discussed for the next generation communication systems, also referred to as 5G. In order to avoid massive signaling this disclosure proposes a measurement activation approach that provides the network with detailed control over when particular wireless devices perform and report measurements, without requiring explicit control signaling at each measurement instance.

LTE is here used as a starting point for describing the future beam based systems, also referred to as 5G.

LTE uses Orthogonal Frequency Division Multiplexing, OFDM. For a better understanding of the disclosure and the principles of resource allocation in time and frequency, a short introduction to OFDM, is given. Today many wireless standards use OFDM. OFDM is a method of encoding digital data on multiple carrier frequencies. That is, a large number of closely spaced orthogonal sub-carrier signals are used to carry data on several parallel data streams or sub-channels. The reason that OFDM is preferred is mainly due to that it allows for relatively simple receiver processing for a wide bandwidth when the communication channel is frequency selective. OFDM also allows for a simple way to share the channels between different users, i.e., wireless devices 200 by simply allocating different sets of sub-carriers, i.e., different sub-channels, to different users. This allocation is known as Orthogonal Frequency-Division Multiple Access, OFDMA. The set of sub-carriers allocated to different users may either be localized, i.e., the sub-carriers to one user are next to one another, or the set of sub-carriers may be distributed, i.e., the sub-carriers are spread out and interlaced with sub-carriers carrying data to other users. Each sub carrier is then divided in time into frames, sub-frames, slots and symbols.

The LTE downlink reference signals are as discussed above classified into Cell specific reference signals, CRS, and UE specific reference signals.

The CRS is cell specific, which means that, these do not depend/change per user but remain same OFDM resource blocks for all the users and entire system, once configured. These reference signals are used by the UE to estimate the downlink channel and do a relative equalization to remove the channel effect over the signal. Hence the UE will generate the CRS on its side and do a comparison of the generated and received CRS to get an estimate of channel effect. The CRS is transmitted with some specific power, which the UE must know, to calculate the multipath effect and this power is conveyed to the UE using SIB messages. The CRS is mapped onto symbol 0, 4, 7 and 11 of all downlink subframes in FDD. The CRS is mapped to every sixth subcarrier in these symbols.

In 5G, a moving wireless device is expected to move between different transmission beams. In order to handle handover between the different beams, mobility measurements are needed. Therefore, so called Mobility Reference Signals, MRS, have been discussed. One possible scenario is that each beam is represented by one unique MRS. A wireless device then detects the MRSs of candidate beams by their unique signatures and reports the measurement results (e.g. a best-quality or otherwise preferred beam) to the network accordingly.

The MRS signatures and time/frequency resource allocation for the individual candidate beams to a given wireless device is preferably coordinated among the access points transmitting candidate beams e.g. via a central coordination unit and inter-access point interfaces or via an enhanced X2-type interface connecting the 5G base stations. The coordination is done to guarantee unique MRS sequences and/or efficient use of time/frequency resources. The coordinated allocation is done on a per-wireless device and per-session basis to allow high flexibility for resource allocation to beams. Here, a session denotes receiving a measurement command, performing a set of measurements of one or more beams, and reporting the results. The per-session coordination is preferably required. It is not efficient system design, and often not even practical, to associate every beam in every access point with fixed unique MRS parameters—that would imply an excessively large MRS sequence space and reserved time/frequency resources unavailable for other purposes.

Figure 1:
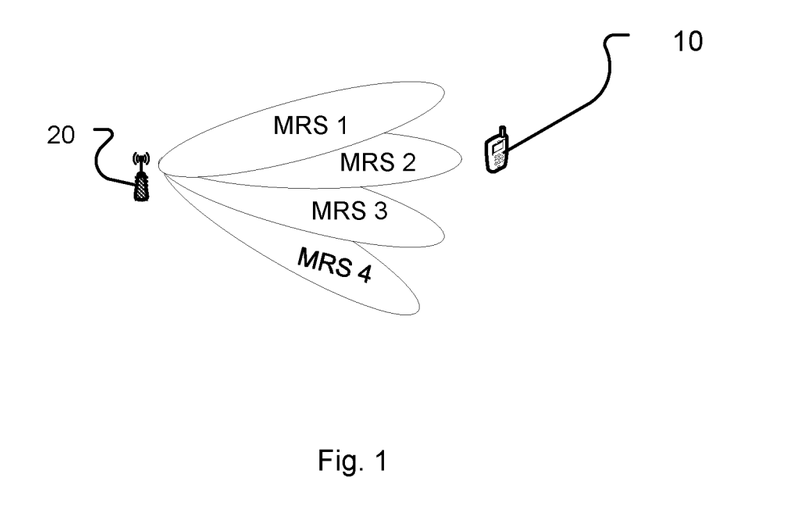
FIG. 1 illustrates multiple link quality measurement signals transmitted from one access point for mobility purposes.

The number of candidate beams that are activated at mobility measurement sessions varies, but anywhere from a few to a few hundred beams may be turned on in some scenarios per one wireless device. The number of wireless devices in a certain geographical area also varies, but up to 4000 wireless devices/km$^2$ may be a typical hotspot density. FIG. 1 illustrates multiple link quality measurement signals transmitted from one access point for mobility purposes.

Figure 2:
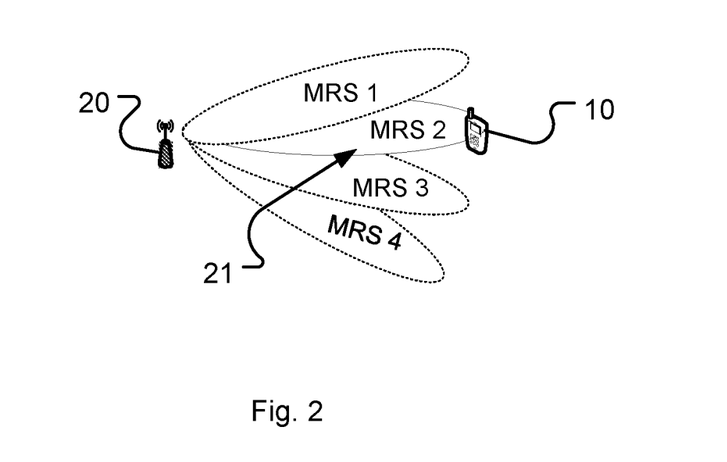
FIG. 2 illustrates multiple link quality measurement signals in overlapping beam directions, wherein one link quality measurement signal is a triggering link quality measurement signal.

The inventors have realized that, mobility measurements and reporting at a wireless device can be initiated when the wireless device detects a specific, predetermined "triggering MRS". In other words, one specific reference signal is used as a trigger, for the wireless device to start measuring on other reference signals, thereby relieving the wireless device from the obligation to blindly search for reference signals. FIG. 2 illustrates multiple link quality measurement signals in overlapping beam directions, wherein one link quality measurement signal is a "triggering MRS" 21. Upon detection of the "triggering MRS" 21, the wireless device searches for additional MRS present and reports the findings (detected MRS IDs, measured signal qualities, etc.) to the network. The proposed method enables detailed control over mobility measurement and reporting behavior of individual wireless devices, without requiring explicit per-measurement signaling for each wireless device, as the triggering MRS is also a link quality measurement signal.

In this disclosure, Mobility Reference Signals in a 5G system will be used as an example to explain the proposed methods. However, it must be understood that the same concept is generally applicable to any link wireless communication system where controlled measurement and reporting mechanisms are used. The term "link quality measurement signal", which is the term used to denote the link specific reference signals, thus refers to any reference signal that is usable to measure channel quality of a corresponding link such as e.g. tied to a cell, sector, beam, node or transmission point. Hence, a link quality measurement signal is configured to provide a detectable signal and enable (at least rough) measurement of the channel quality. Often it also enables synchronization in time and frequency.

Hence, in this disclosure mobility measurements are used as an example, but the methods are not restricted thereto, but the technique might as well be applicable e.g. to reference signals used for Channel State Information, CSI, purposes etc. In those cases, the expression a "candidate beams", refers to beams where beam quality measurements needs to be performed. In other words link quality measurement signals are according to some aspects dedicated mobility measurement signals, but the same principle is applicable to data plane signals like Channel State Information Reference Signal, CSI-RS, or Demodulation Reference Signal, DMRS, that can be used for serving and candidate link quality evaluation.

Example Operations

The proposed methods will now be described in more detail referring to FIG. 3 and FIG. 4. It should be appreciated that FIG. 3 and FIG. 4 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed. The example operations may be performed in any order and in any combination.

Figure 3:
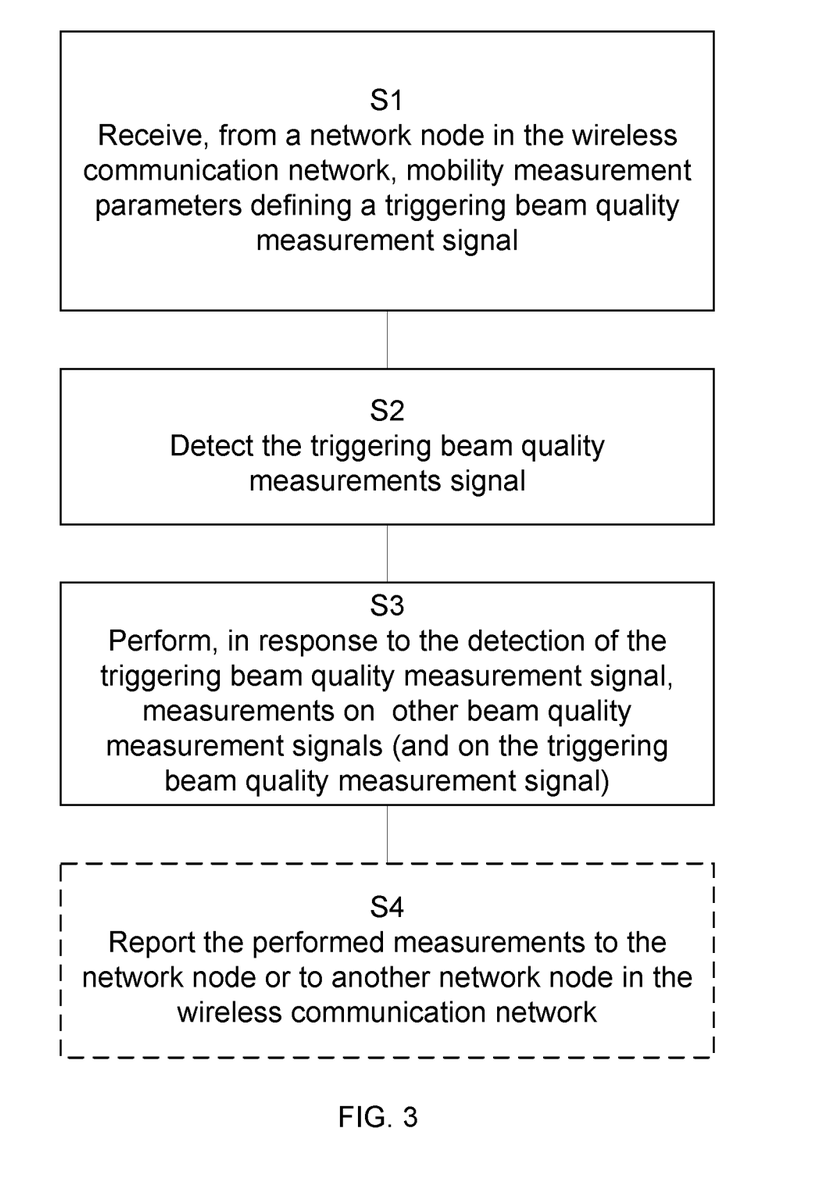
FIG. 3 is a flow chart that illustrates the method steps performed in a network node according to some aspects of the present disclosure.
Figure 4:
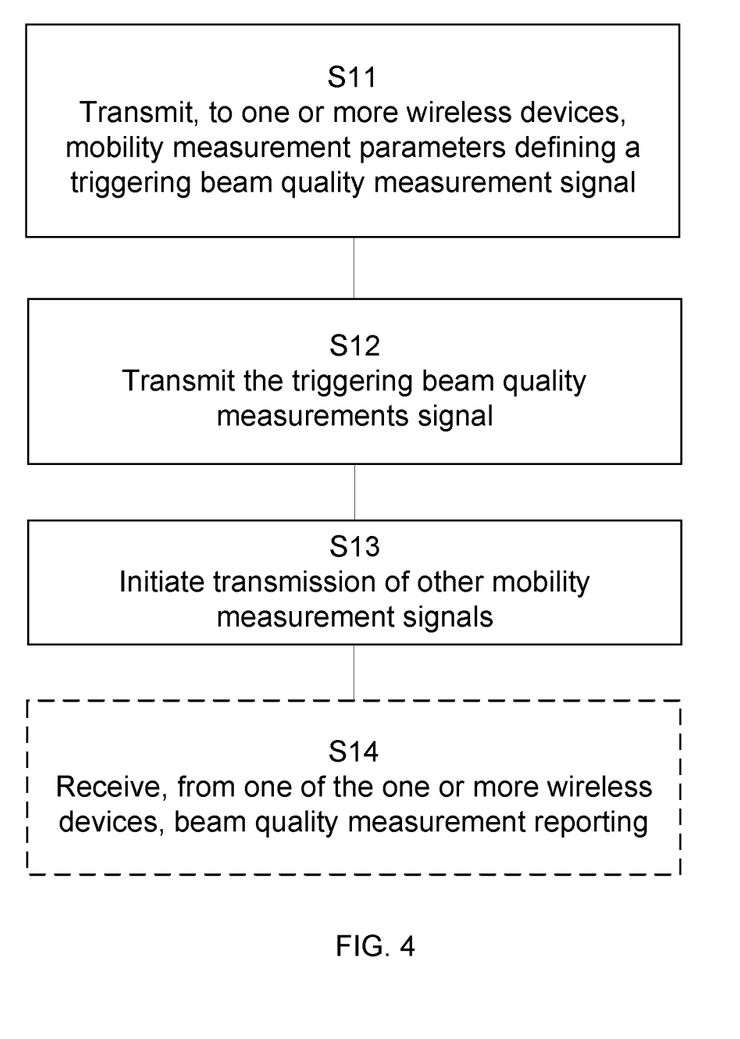
FIG. 4 is a flow chart that illustrates the method steps performed in a wireless device according to some aspects of the present disclosure.

FIG. 3 illustrates a method for handling link quality measurements, the method being performed by a wireless device 10 in a wireless communication network such as the system of FIG. 2. The method could be performed any time e.g. when the wireless device is connected to a network node via a serving beam 21.

In the following, the serving access node or serving beam are referred to as the serving link, and any candidate nodes or beams whose quality is to be evaluated in the measurements as the candidate links. The description of the proposed technique thus does not depend upon whether the link quality measurement signals are transmitted at the beam or access node level.

The method comprises receiving S1, from a network node in the wireless communication network, measurement parameters defining a triggering link quality measurement signal. In other words, the wireless device receives measurement parameters defining the triggering beam quality measurement signal, such as a reference sequence identifier of the triggering link quality measurement signal. The wireless device could be configured with several triggering link quality measurement signals. The wireless device could respond to any one of them, or perform different measurement configurations in response to different ones.

The information is for example conveyed via Layer 3 i.e. RRC signaling and takes typically place ahead of time of the actual mobility measurement procedures. For example, this is performed when the wireless device connects to the serving network node.

The measurement parameters possibly also comprise other additional parameters relating to the measurement session. For example, the measurement parameters define the radio resources for the triggering link quality measurement signal or a signal quality threshold for detecting the triggering link quality measurement signal. For example, the network signals to the wireless device the candidate link quality measurement signal configuration, e.g. their time/frequency allocation and/or sequence information. If sequence information is omitted, the wireless device may be implicitly configured to perform blind detection of all possible link quality measurement signal sequences. Similarly, if time/frequency allocation information is omitted, the wireless device may be implicitly configured to perform blind detection over the entire frequency band.

According to some aspects, the measurement parameters comprise reference sequence identifiers of other link quality measurement signals. Stated differently, the measurement parameters not only specify the triggering signal, but also the signals that the wireless device should measure in response to detecting the trigger.

The measurement parameters according to some aspects also indicate radio resources for the other link quality measurement signals and signal quality thresholds for detecting the other link quality measurement signals. Hence, one triggering link quality measurement signal is e.g. tied to a number of other link quality measurement signals. If no other link quality measurement signals are specified, the wireless device might measure on a full range of link quality measurement signals.

The information measurement parameters according to some aspects also define whether the triggering link quality measurement signal is guaranteed to be transmitted via the serving link. The measurement parameters may also comprise any other link quality measurement parameters or link quality reporting parameters. According to some aspects, the network also signals measurement and reporting configuration instructions, e.g. filtering to be used and signaling parameters for the uplink reply.

The method further comprises detecting S2 the triggering link quality measurement signal. This typically implies that the wireless device continuously searches for a triggering link quality measurement signal sequence defined by the measurement parameters. When the wireless device detects the triggering link quality measurement signal sequence it executes the mobility measurements. In general, triggering link quality measurement signal search entails searching for an associated TSS sequence over a certain time/frequency offset window. If the triggering link quality measurement signal is not detected with a sufficient signal quality, the wireless device returns to monitoring for triggering link quality measurement signal, without performing any further search or detection in the received data.

According to some aspects, the triggering link quality measurement signal is a link quality measurement signal of a serving link used for downlink transmissions from the network node to the wireless device. If the wireless device has been informed that the triggering link quality measurement signal will be transmitted from the serving node, the presence of the triggering link quality measurement signal sequence is, according to some aspects, only checked at the current time/frequency synchronization settings.

The method further comprises performing S3, in response to the detection of the triggering link quality measurement signal, measurements on other link quality measurement signals.

The measurements are configured according to the previously received S1 or obtained measurement parameters.

In other words, once the triggering link quality measurement signal has been detected, the wireless device starts to search for reference sequences of other link quality measurement signals as well and performs measurements on those signals. Stated differently, performing measurements comprises searching for an associated reference sequence over a certain time and frequency window.

According to some aspects, the other link quality measurement signals are link quality measurement signals of candidate links for downlink transmissions to the wireless device. If an explicit candidate link quality measurement signal list has been provided, the wireless device attempts to detect and measure the quality of the specified link quality measurement signals. Otherwise, the wireless device blindly attempts to detect and measure any link quality measurement signal it can detect.

When receiving data, the received samples are typically buffered (i.e. recorded in a buffer) and can be post-processed to perform any measurements that could be done on live data such as extracting different measurement signals and estimating their power etc. Hence, this step does not necessarily imply additional reception of data.

According to some aspects the method comprises performing S3a, in response to the detection of the triggering link quality measurement signal, measurements on the triggering link quality measurement signals. Hence, the measurements might be performed on the triggering link quality measurement signal as well as on the other link quality measurement signals. In such case no additional signaling is required in order to trigger the measurement session.

According to some aspects, the triggering link quality measurement signal is transmitted via the serving link, with which the wireless device maintains time/frequency synchronization. Then monitoring for the triggering link quality measurement signal does thus not require searching the time/frequency space. Hence, the method constitutes a lightweight signaling mechanism.

According to some aspects, the method comprises reporting S4 the performed measurements to the network node or to one or more other network nodes in the wireless communication network. In other words, after the link quality measurement signal measurements have been completed, the wireless device reports the results back to the NW. This is done according to the previously obtained instructions (step S1) and may include Layer 1 and/or Layer 3 signaling.

A corresponding method, performed in a network node in a wireless communication network for handling link quality measurements, will now be described referring to FIG. 4. The method is performed at any time, when a network node, for example the network nodes 20 in FIG. 2, needs updated link quality information.

The method comprises transmitting S11, to one or more wireless devices, measurement parameters defining a triggering link quality measurement signal. For example, the network signals to the wireless device the triggering link quality measurement signal configuration. As discussed above measurement parameters comprises one or more of its time/frequency allocation, its sequence identifier, a signal quality threshold, and whether it is guaranteed to be transmitted via the serving link. According to some aspects, the link quality measurement signals are used to perform measurements in respective beams, nodes, sectors or cells.

According to some aspects the network also signals to the wireless device the candidate link quality measurement signal configuration, e.g. their time/frequency allocation and/or sequence information. If sequence information is omitted, the wireless device may be implicitly configured to perform blind detection of all possible link quality measurement signal sequences. Similarly, if time/frequency allocation information is omitted, the wireless device may be implicitly configured to perform blind detection over the entire frequency band. The network also signals measurement and reporting configuration instructions, e.g. filtering to be used and signaling parameters for the uplink reply.

The method further comprises transmitting S12 the triggering link quality measurements signal. In other words, the network transmits the previously agreed triggering link quality measurement signal to indicate to the wireless device that mobility measurements are to be initiated. This is e.g. done when the network decides to start the mobility procedure e.g. due to decreased serving link quality.

According to some aspects, the triggering link quality measurement signal is a link quality measurement signal of a serving link used for downlink transmissions from the network node to the wireless device. In other words, the triggering link quality measurement signal is transmitted from the current serving node.

The method further comprises initiating S13 transmission of other mobility measurement signals. This implies that, link quality measurement signals in other candidate links are activated for the purposes of measurements. Transmissions of the other links are e.g. from the network node 20, i.e. from the same node as the triggering link quality measurement signal. However, link quality measurement signals from other network nodes or transmission points are also possible. In case transmissions are initiated from other network nodes, the network node 20 communicates with the other network nodes in order to initiate the transmissions.

According to some aspects, the triggering link quality measurement signal is transmitted at the same time as the other mobility measurement signals. Stated differently, transmission of the triggering link quality measurement signal and the other link quality measurement signals occur simultaneously. The triggering link quality measurement signal as discussed above according to some aspects belongs to a specific set of other link quality measurement signals e.g. candidate link quality measurement signals.

According to some aspects, the triggering link quality measurement signal is transmitted before the other mobility measurement signals. According to some aspects, the candidate link quality measurement signals are transmitted before the triggering link quality measurement signal is transmitted.

According to some aspects, the method further comprises receiving S14, from one of the one or more wireless devices, link quality measurement reporting. In other words, the network receives the report. After receiving the mobility measurement report, the network can use the information to initiate further mobility operations, e.g. a beam switch or node handover.

According to some aspects, a common triggering link quality measurement signal is defined to act as a trigger to any wireless device in the network. Such as triggering link quality measurement signal is e.g. predefined in the standard or provided to the UE via common system information. Any wireless device that detects that triggering link quality measurement signal will then measure and report. In another aspect, which is partly related to the former aspect, a common triggering link quality measurement signal is defined for a group of wireless devices in the network.

Example Node Configuration

Figure 5:
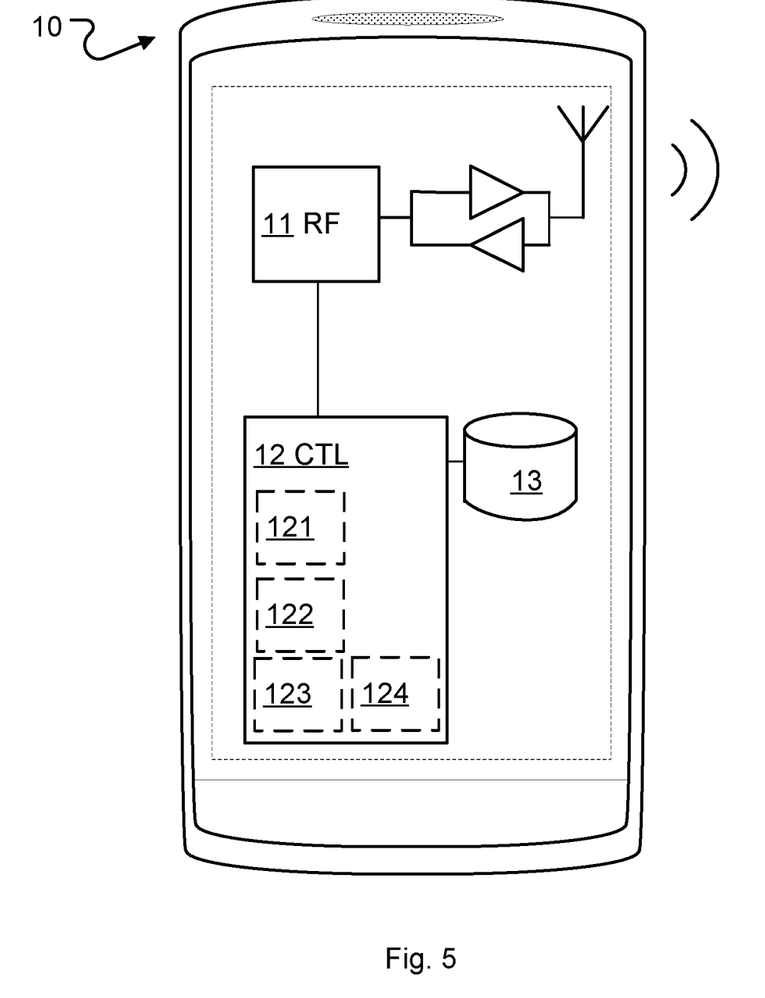
FIG. 5 is an example node configuration of a network node, according to some of the example embodiments.

Turning to FIG. 5, a schematic diagram illustrating some modules of an example embodiment of a wireless device being configured for handling link quality measurements will now be briefly described. The wireless device is configured to implement the methods described in relation to FIG. 3.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or Global Positioning System, GPS, receiver; a Personal Communications System, PCS, user equipment that according to some aspects combine a cellular radiotelephone with data processing; a Personal Digital Assistant, PDA, that can include a radiotelephone or wireless communication system; a laptop; a camera (e.g., video and/or still image camera) having communication ability; and any other computation or communication device capable of transceiving, such as a personal computer, a home entertainment system, a television, etc.

As shown in FIG. 5, the wireless device 10 comprises a radio communication interface or radio circuitry 11 configured to receive and transmit any form of communications or control signals within a network. It should be appreciated that the radio circuitry 11 is according to some aspects comprised as any number of transceiving, receiving, and/or transmitting units or circuitry. It should further be appreciated that the radio circuitry 11 may e.g. be in the form of any input/output communications port known in the art. The radio circuitry 11 e.g. comprises RF circuitry and baseband processing circuitry (not shown).

The wireless device 10 according to some aspects further comprises at least one memory unit or circuitry 13 that is in communication with the radio circuitry 11. The memory 13 may e.g. be configured to store received or transmitted data and/or executable program instructions. The memory 13 is e.g. configured to store any form of measurement data. The memory 13 is e.g. be any suitable type of computer readable memory and may e.g. be of volatile and/or non-volatile type The wireless device 10 further comprises processing circuitry 12 which configured to cause the wireless device to receive, from a network node in the wireless communication network, measurement parameters defining a triggering link quality measurement signal, to detect the triggering link quality measurements signal, and to perform, in response to the detection of the triggering link quality measurement signal, measurements on other link quality measurement signals.

The processing circuitry 12 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry.

The controller, CTL, or processing circuitry 12 is e.g. constituted by any suitable type of computation unit, e.g. a microprocessor, Central Processing Unit, CPU, microcontroller, Digital Signal Processor, DSP, Field Programmable Gate Array, FPGA, or Application Specific Integrated Circuit, ASIC, or any other form of circuitry capable of executing computer program code. The computer program is e.g. stored in a memory, MEM, 13. The memory 13 can be any combination of a Random Access Memory, RAM, and a Read Only Memory, ROM. The memory 13 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a wireless device to execute the methods described above and below.

According to some aspects, the processing circuitry 12 is configured to cause the wireless device to perform, in response to the detection of the triggering link quality measurement signal, measurements on the triggering link quality measurement signals.

According to some aspects, the processing circuitry 12 is configured to cause the wireless device to report the performed measurements to the network node or to one or more other network nodes in the wireless communication network.

According to some aspects, the triggering link quality measurement signal is a link quality measurement signal of a serving link used for downlink transmissions from the network node to the wireless device.

According to some aspects, the other link quality measurement signals are link quality measurement signals of candidate links for downlink transmissions to the wireless device.

According to some aspects the wireless device 10 or the processing circuitry 12 comprises modules configured to perform the methods described above. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises a receiver module 121 configured to cause the wireless device to receive, from a network node in the wireless communication network, measurement parameters defining a triggering link quality measurement signal.

According to some aspects the wireless device 10 or the processing circuitry 12 comprises a detector 122 configured to cause the wireless device to detect the triggering link quality measurements signal.

According to some aspects the wireless device 10 or the processing circuitry 12 comprises a performer 123 configured to cause the wireless device to perform, in response to the detection of the triggering link quality measurement signal, measurements on other link quality measurement signals.

According to some aspects the wireless device 10 or the processing circuitry 12 comprises a reporter 124 configured to cause the wireless device to report the performed measurements to the network node or to one or more other network nodes in the wireless communication network.

Figure 6:
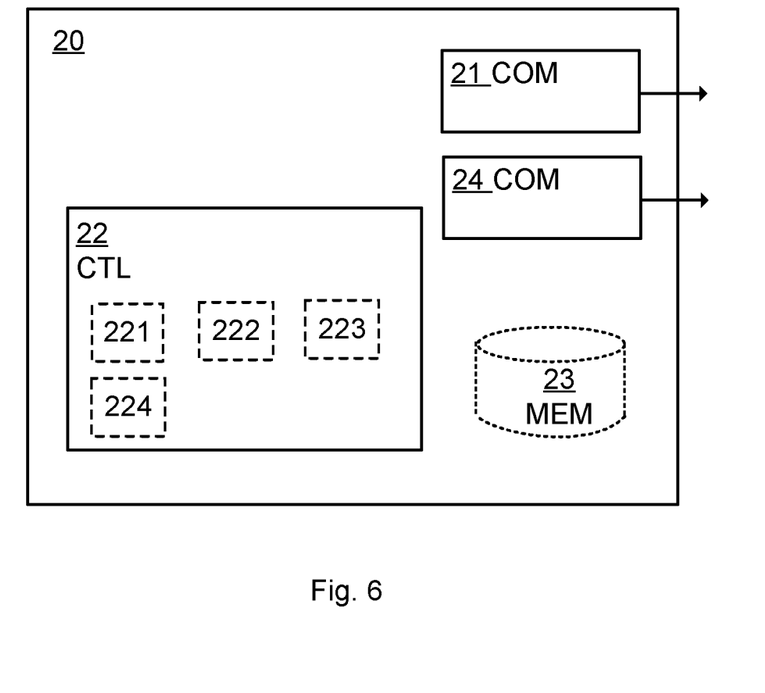
FIG. 6 is an example node configuration of a wireless device, according to some of the example embodiments.

Turning now to FIG. 6, a schematic diagram illustrating some modules of an example embodiment of a network node being configured for handling link quality measurements. The network node 20 is typically a radio network node or base station, such as an eNodeB in LTE, providing wireless access to wireless devices within one or more areas referred to as cells. The network node is configured to implement the methods described in relation to FIG. 4.

The network node 20 comprises a radio communication interface (i/f) 21 configured for communication with wireless devices 10. The wireless communication interface 21 is arranged for wireless communication with other network nodes within range of the network node 20. The radio communication interface 21 may be adapted to communicate over one or several radio access technologies. If several technologies are supported, the node typically comprises several communication interfaces, e.g. one WLAN or Bluetooth communication interface and one cellular communication interface.

As shown in FIG. 6, the network node 20 according to some aspects comprises a network communication interface 24. The network communication interface 24 is configured for communication with other network nodes e.g. in a core network. This communication is often wired e.g. using fiber. However, it may as well be wireless.

The network node 20 comprises a controller, CTL, or a processing circuitry 22 that may be constituted by any suitable Central Processing Unit, CPU, microcontroller, Digital Signal Processor, DSP, etc. capable of executing computer program code. The computer program may be stored in a memory, MEM 23. The memory 23 can be any combination of a Random Access Memory, RAM, and a Read Only Memory, ROM. The memory 23 may also comprise persistent storage, which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program.

The processing circuitry 22 is configured to cause the network node 20 to transmit, to one or more wireless devices, measurement parameters defining a triggering link quality measurement signal, to transmit the triggering link quality measurements signal; and to initiate transmission of other mobility measurement signals.

According to some aspects, the processing circuitry 22 is configured to cause the network node 20 to receive, from one of the one or more wireless devices, link quality measurement reporting.

According to some aspects, the triggering link quality measurement signal is a link quality measurement signal of a serving link used for downlink transmissions from the network node to the wireless device.

According to some aspects, the processing circuitry 22 is configured to cause the network node 20 to transmit the triggering link quality measurement signal at the same time as the other mobility measurement signals.

According to some aspects, the processing circuitry 22 is configured to cause the network node 20 to transmit the triggering link quality measurement signal before the other mobility measurement signals.

According to some aspects the processing circuitry 22 or the network node 20 comprises modules configured to perform the methods described above. The modules are implemented in hardware or in software or in a combination thereof. The modules are according to one aspect implemented as a computer program stored in a memory 13 which run on the processing circuitry 12.

According to some aspects, network node comprises a first transmitter module 221 configured to cause the network node to transmit, to one or more wireless devices, measurement parameters defining a triggering link quality measurement signal.

According to some aspects, network node comprises a second transmitter module 222 configured to cause the network node to transmit the triggering link quality measurements signal.

According to some aspects, network node comprises an initiator module 223 configured to cause the network node to initiate transmission of other mobility measurement signals.

According to some aspects, network node comprises an initiator module 223 configured to cause the network node to receive S14, from one of the one or more wireless devices, link quality measurement reporting.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for handling link quality measurements, the method being performed by a wireless device in a wireless communication network, the method comprising:
   receiving, from a network node in the wireless communication network, measurement parameters defining a triggering link quality measurement signal;
   detecting the triggering link quality measurement signal; and
   performing, in response to the detection of the triggering link quality measurement signal:
      performing a search for other link quality measurement signals; and
      performing measurements on the other link quality measurement signals.

2. The method of claim 1, further comprising performing, in response to the detection of the triggering link quality measurement signal, measurements on the triggering link quality measurement signals.

3. The method of claim 1, further comprising reporting the performed measurements to the network node or to one or more other network nodes in the wireless communication network.

4. The method of claim 1, wherein the triggering link quality measurement signal is a link quality measurement signal of a serving link used for downlink transmissions from the network node to the wireless device.

5. The method of claim 1, wherein the other link quality measurement signals are link quality measurement signals of candidate links for downlink transmissions to the wireless device.

6. The method of claim 1, wherein the performing measurements comprises searching for an associated reference sequence over a certain time and frequency window.

7. The method of claim 1, wherein the other link quality measurement signals are used to perform measurements in respective beams, nodes, sectors or cells.

8. The method of claim 1, wherein the measurement parameters comprise at least one of:
   a reference sequence identifier of the triggering link quality measurement signal;
   radio resources for the triggering link quality measurement signal;
   a signal quality threshold for detecting the triggering link quality measurement signal;
   reference sequence identifiers of the other link quality measurement signals;
   radio resources for the additional link quality measurement signals;
   signal quality thresholds for detecting the other link quality measurement signals;
   information defining whether the triggering link quality measurement signal is guaranteed to be transmitted via the serving link;
   other link quality measurement parameters;
   link quality reporting parameters.

9. A method for handling link quality measurements, the method being performed by a network node, the method comprising:
   transmitting, to one or more wireless devices, measurement parameters defining a triggering link quality measurement signal;
   transmitting the triggering link quality measurement signal, wherein transmitting the triggering link quality measurement signal causes a wireless device receiving the triggering link quality measurement signal to:
      perform a search for other mobility measurement signals; and
      perform measurements on the other mobility measurement signals; and
   initiating transmission of other mobility measurement signals.

10. The method of claim 9, further comprising receiving, from the wireless device, link quality measurement reporting.

11. The method of claim 9, wherein the triggering link quality measurement signal is a link quality measurement signal of a serving link used for downlink transmissions from the network node to the wireless device.

12. The method of claim 9, wherein the triggering link quality measurement signal is transmitted at the same time as the other mobility measurement signals.

13. The method of claim 9, wherein the triggering link quality measurement signal is transmitted before the other mobility measurement signals.

14. The method of claim 9, wherein the link quality measurement signals are used to perform measurements in respective beams, nodes, sectors or cells.

15. The method of claim 9, wherein the measurement parameters comprise at least one of:
   a reference sequence identifier of the triggering link quality measurement signal;
   radio resources for the triggering link quality measurement signal;
   a signal quality threshold for detecting the triggering link quality measurement signal;
   reference sequence identifiers of the other link quality measurement signals;
   radio resources for the additional link quality measurement signals;
   signal quality thresholds for detecting the other link quality measurement signals;
   information defining whether the triggering link quality measurement signal is guaranteed to be transmitted via the serving link;
   other link quality measurement parameters;
   link quality reporting parameters.

16. A wireless device configured for handling link quality measurements, the wireless device comprising:
   a radio communication interface configured to communicate with a network node in a wireless communication network; and
   processing circuitry configured to cause the wireless device to:
      receive, from the network node, measurement parameters defining a triggering link quality measurement signal;
      detect the triggering link quality measurement signal; and
      perform, in response to detecting the triggering link quality measurement signal:

a search for other link quality measurement signals; and measurements on the other link quality measurement signals.

17. The wireless device of claim 16, wherein the processing circuitry is configured to cause the wireless device to perform, in response to detecting the triggering link quality measurement signal, measurements on the triggering link quality measurement signals.

18. The wireless device of claim 16, wherein the processing circuitry is configured to cause the wireless device to report the performed measurements to the network node or to one or more other network nodes in the wireless communication network.

19. The wireless device of claim 16, wherein the triggering link quality measurement signal is a link quality measurement signal of a serving link used for downlink transmissions from the network node to the wireless device.

20. The wireless device of claim 16, wherein the other link quality measurement signals are link quality measurement signals of candidate links for downlink transmissions to the wireless device.

21. A network node, in a communication system, the network node being configured for handling link quality measurements, the network node comprising:
 a radio communication interface configured for communication with one or more wireless devices; and
 processing circuitry configured to cause the network node to:
  transmit, to one or more wireless devices, measurement parameters defining a triggering link quality measurement signal;
  transmit the triggering link quality measurement signal, thereby causing a wireless device receiving the triggering link quality measurement signal to:
   perform a search for other mobility measurement signals; and
   perform measurements on the other mobility measurement signals; and
  initiate transmission of other mobility measurement signals.

22. The network node of claim 21, wherein the processing circuitry is configured to cause the network node to receive, from one of the wireless device, link quality measurement reporting.

23. The network node of claim 21, wherein the triggering link quality measurement signal is a link quality measurement signal of a serving link used for downlink transmissions from the network node to the wireless device.

24. The network node of claim 21, wherein the processing circuitry is configured to cause the network node to transmit the triggering link quality measurement signal at the same time as the other mobility measurement signals.

25. The network node of claim 21, wherein the processing circuitry is configured to cause the network node to transmit the triggering link quality measurement signal before the other mobility measurement signals.

26. A non-transitory computer readable recording medium storing a computer program product for handling link quality measurements, the computer program product comprising software instructions which, when run on processing circuitry of a wireless device in a wireless communication network, causes the wireless device to:
 receive, from a network node in the wireless communication network, measurement parameters defining a triggering link quality measurement signal;
 detect the triggering link quality measurement signal; and
 perform, in response to detecting the triggering link quality measurement signal;
 a search for other link quality measurement signals; and
 measurements on the other link quality measurement signals.

27. A non-transitory computer readable recording medium storing a computer program product for handling link quality measurements, the computer program product comprising software instructions which, when run on processing circuitry of a network node, causes the network node to:
 transmit, to one or more wireless devices, measurement parameters defining a triggering link quality measurement signal;
 transmit the triggering link quality measurement signal, thereby causing a wireless device receiving the triggering link quality measurement signal to:
  perform a search for other mobility measurement signals; and
  perform measurements on the other mobility measurement signals; and
 initiate transmission of other mobility measurement signals.

* * * * *